United States Patent [19]

Roncato et al.

[11] Patent Number: 5,316,561
[45] Date of Patent: May 31, 1994

[54] APPARATUS FOR MANUFACTURING A COMPOSITE STRAND FORMED OF REINFORCING FIBERS AND OF ORGANIC THERMOPLASTIC MATERIAL

[75] Inventors: Giordano Roncato; Robert Fedorowsky, both of Aix les Bains; Philippe Boissonnat, Barby; Dominique Loubinoux, Chambery, all of France

[73] Assignee: Vetrotex France, Chambery

[21] Appl. No.: 852,279

[22] Filed: Mar. 16, 1992

[30] Foreign Application Priority Data

Mar. 19, 1991 [FR] France .................. 91 03273

[51] Int. Cl.[5] .................................. C03B 37/022
[52] U.S. Cl. ................................. 65/1; 65/4.3; 65/3.44; 156/167; 156/296; 57/244
[58] Field of Search ............... 65/1, 4.1, 4.3, 3.44; 156/167, 296; 264/174, 211.12, 211.17; 57/249, 244; 428/374

[56] References Cited

U.S. PATENT DOCUMENTS

| | | | |
|---|---|---|---|
| 2,289,568 | 7/1942 | Bloch | 57/244 |
| 2,318,679 | 5/1943 | Dreyfus | 264/211.17 |
| 3,299,469 | 1/1967 | Charlton | |
| 3,551,949 | 1/1971 | Leybourne, III et al. | |
| 5,011,523 | 4/1991 | Roncato et al. | 65/2 |

FOREIGN PATENT DOCUMENTS 1161380  1/1964  Fed. Rep. of Germany ...... 156/167

Primary Examiner—W. Gary Jones
Assistant Examiner—John Hoffmann
Attorney, Agent, or Firm—Pennie & Edmonds

[57] ABSTRACT

An apparatus for manufacturing a strand composed of organic filaments and glass filaments for use in the production of composite materials. This apparatus comprises at least one die, which is supplied with molten glass, and at least one drawing head, which is supplied under pressure with organic thermoplastic material, and from which are simultaneously drawn continuous filaments that are combined to form a composite strand. The drawing head comprises a central passage through which filaments of glass are drawn, and is shielded by a hood. The top of the hood includes an opening situated in the centerline of the passage, and the bottom of the hood is formed of a wall which surrounds the drawing head and extends below the level of the bottom of the head. The drawing head is connected with a device for cooling the organic filaments.

16 Claims, 5 Drawing Sheets

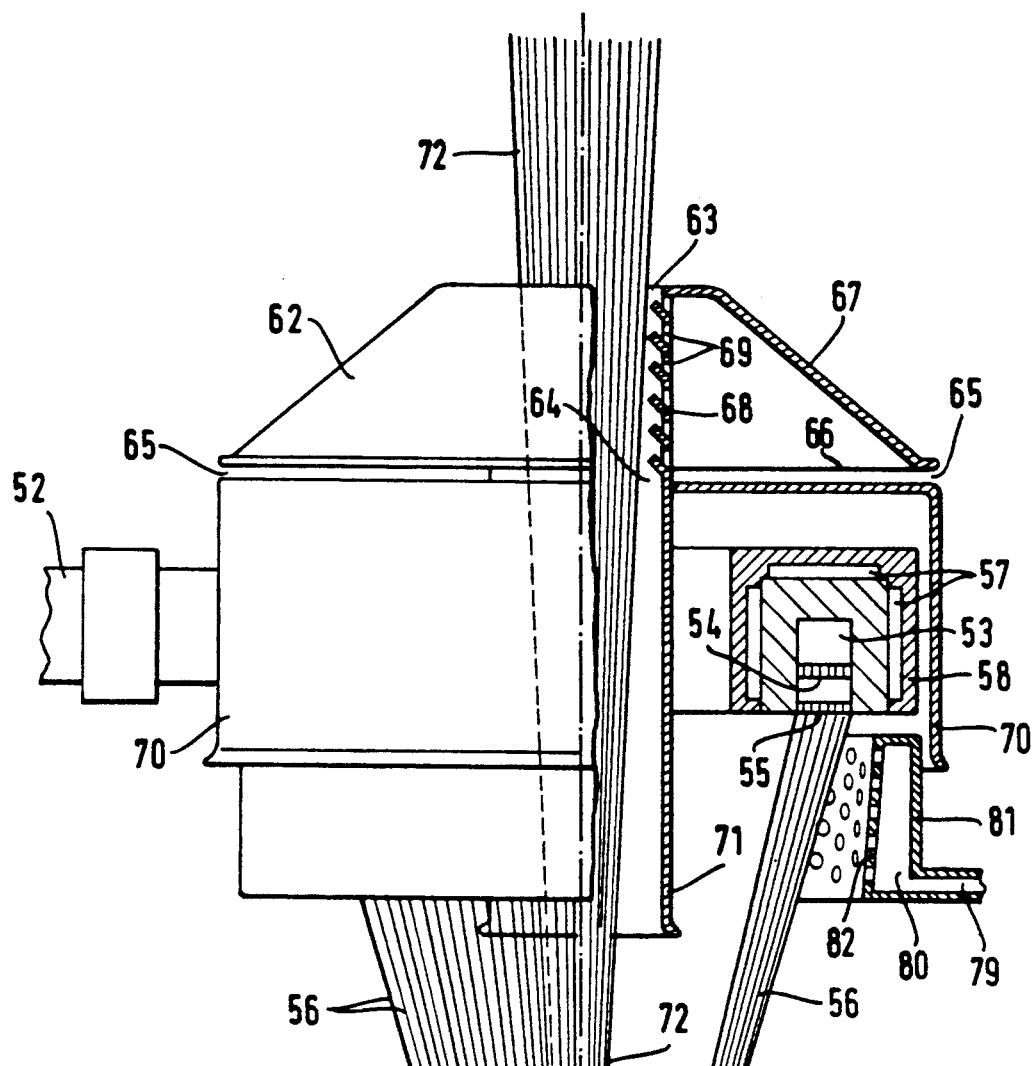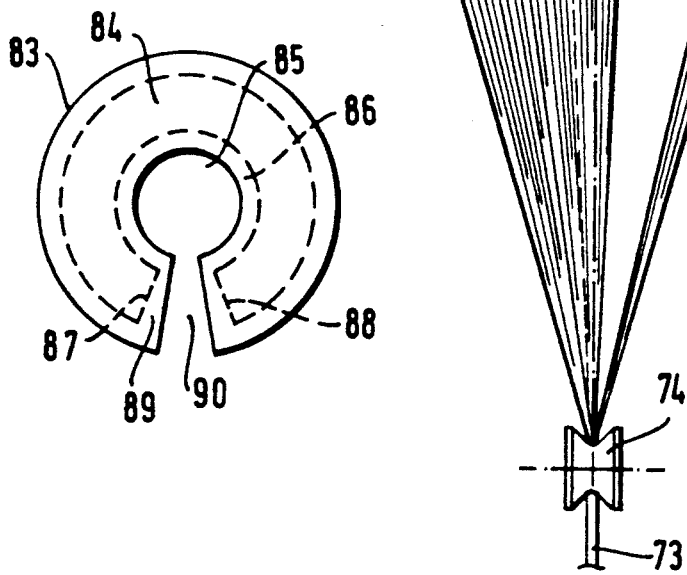

5,316,561

APPARATUS FOR MANUFACTURING A COMPOSITE STRAND FORMED OF REINFORCING FIBERS AND OF ORGANIC THERMOPLASTIC MATERIAL

BACKGROUND OF THE INVENTION

The invention relates to an apparatus for manufacturing a strand formed of reinforcing fibers, such as glass fibers, and fibers formed of an organic thermoplastic material.

The invention is employed with a manufacturing apparatus composed of two installations: the first comprises at least one die, which is supplied with glass, from the orifices of which continuous filaments are mechanically drawn; the second comprises at least one drawing head, which is supplied with organic thermoplastic material, from the orifices of which continuous filaments are mechanically drawn. Such an apparatus is described, for example, in U.S. Pat. No. 5,011,523.

This patent discloses various examples of installations that, when used in combination, are employed for the direct production of a composite strand. Thus, certain installations are equipped in a manner such that the glass filaments that are drawn (whether or not they are combined into strand form) pass through a drawing head that delivers a conical layer of organic filaments.

Glass filaments and organic filaments are drawn at rates that may attain dozens of meters per second. Under such drawing conditions, the air in the vicinity of the filaments is propelled and moves in a more or less disorderly manner in proximity of the fiber extrusion installations. When glass filaments and organic filaments are drawn in a manner such that they travel along coaxial paths, the air flow in the entire drawing area is particularly pronounced. This applies particularly to the area of the drawing head which delivers organic filaments. This drawing head and the surrounding equipment presents an obstacle to the flow of air induced by the different filaments. This produces a convection current which is relatively poorly controlled, especially near the area where the organic filaments are drawn. This phenomenon interferes with the cooling of the filaments and may produce fluctuations in the diameter of the drawn filaments, and even breakage of one or more filaments. This results in a localized variation in the percentage of organic material in relation to glass, which may present a disadvantage when the manufactured composite strand is employed for the direct production of a composite material.

SUMMARY OF THE INVENTION

The object of the apparatus according to the invention, when used in an installation where glass filaments and organic filaments are drawn in a coaxial manner, is to control the flow of air generated by the different filaments.

The object of the apparatus according to the invention, in such an installation, is to regulate the air convection currents in the area where the organic filaments are formed.

A further object of the apparatus according to the invention is to provide a uniform rate of cooling of the organic filaments.

The object of the invention is accomplished by using an apparatus for manufacturing a composite strand, which is composed of a first installation comprising at least one die, which is supplied with glass and heated by Joule effect, wherein its bottom side is equipped with a plurality of orifices from which continuous filaments are drawn.

According to the invention, the second installation of the apparatus for manufacturing the composite strand may comprise a plurality of drawing heads. Thus, the second installation may comprise three or even four conventional drawing heads, that is, heads in the shape of a parallelepiped. They are situated in proximity to each other, such that their lateral walls define a central passage that is generally prismatic in shape, with a triangular or square section.

One of the lateral walls of these drawing heads may be curved inwardly. The drawing heads are then arranged, in twos or threes, such that they define a central passage which is generally cylindrical in shape.

The second installation may comprise a single drawing head, which is equipped with a central passage, and which externally displays an annular shape such as that disclosed in the aforementioned U.S. Pat. No. 5,011,523, or a prismatic or other shape. The shape of this central passage may differ from that defined by its exterior lateral wall, for example, it may be cylindrical while the exterior wall may be prismatic in shape.

In certain cases, this drawing head is not entirely enclosed and comprises two extremities that delimit a lateral passage, which allows free access to the central passage. This may be advantageous in certain installations, as shall be further described in the detailed description.

The drawing head or heads of the second installation of the apparatus are each shielded by a hood, the top part of which fits above the head and which is box-shaped from the outside, and which contains at the top an opening situated in the centerline of the central passage. The bottom part of the hood is formed of a wall surrounding the drawing head or heads and extending below the level of the bottom side of the head.

The purpose of the hood which covers and surrounds the drawing head or heads of the second installation is to deflect the flow of air generated by the glass filaments away from the area where the organic filaments are formed. It also provides protection for the thermoplastic filaments, which are extremely fragile in the area under the die where they are still in the viscous state. The hood also provides protection against particles of material that are carried by the strand or the glass filaments, such as small glass fibers or tiny drops of size.

The top part of the hood covering the drawing head or heads is formed of one or more lateral walls that are inclined in relation to the centerline of the central passage. Thus, the hood may, for example, be frusto-conical or frusto-prismatic in shape, with the large base covering the drawing head or heads. The effect of the said inclined lateral wall or walls is to divert to the outside of the drawing area at least part of the air that is propelled by the glass filaments, thereby eliminating one cause of irregularity in the operation of the drawing head.

In spite of this particular configuration of the hood, part of the air generated by the glass filaments penetrates inside the hood through the opening situated at its top. This air may be evacuated, at least in part, through one or more lateral apertures that open to the outside, preferably at the base of the lateral wall of the top part of the hood. The apertures may, for example, be in the form of one or more horizontal slots.

The base of the top part of the hood may be implemented in the form of a flat plate that fits above the drawing head or heads. This plate comprises at its center an opening situated in the centerline of the central passage.

The top part of the hood may comprise a wall which is perforated with orifices, and which extends, inside the hood, from the edge of the opening situated at its top to the top part of the central passage.

The hood may comprise an inside wall that is, for example, cylindrical or prismatic in shape, wherein its perpendicular section is of the same size or smaller than that of the central passage of the drawing head or heads, and which extends from the summit of the central passage to at least the same level as the base of the wall that externally forms the bottom part of the hood. This inside wall is solid. It may be connected to the edge of the opening situated at the center of the plate that serves as a base for the top part of the hood. It may also be connected to the base of the inside wall that extends from the top of the hood to the top part of the central passage. In this embodiment, the hood comprises an inside wall, which extends as a single piece from the edge of the opening situated at its top down to the base of the wall that externally forms the bottom part of the hood. This inside wall, which is cylindrical or prismatic in shape, may display, along its entire length, a perpendicular section which is the same size or smaller than that of the central passage; in this case, its top part is perforated with orifices, and its bottom part is solid.

The object of the invention is also promoted by the fact that the bottom part of the hood at least partly covers a device for blowing a gaseous fluid, the extremity or extremities of which are equipped with one or more orifices opening toward the area where the organic filaments are formed. The extremities are positioned between the central passage and the organic filaments, and/or between the bottom wall of the hood and the area where the filaments are formed.

The fluid blowing device provides both for cooling the organic filaments during their formation and for stabilizing the flow of air near the orifices through which the organic material is extruded.

The blowing device may be formed of one or more fluid intake ducts, which are connected to one or more conduits situated above the drawing head or heads, and extending along the lateral wall of the heads delimiting the central passage and ending in an orifice or a plurality of orifices that are directed toward the area where the organic filaments are formed.

The fluid intake ducts may be connected to conduits that descend along the outside lateral wall of the drawing heads. They may also descend along the inside wall which forms the bottom part of the hood.

The extremity of the conduit or conduits may end in at least one slot which opens below the bottom side of the drawing head or heads. These slots may be straight, curved, or even annular, depending on the configuration of the orifices in the drawing heads. A diffuser is advantageously placed upstream from each slot so as to distribute the gaseous fluid in a uniform manner in proximity to the organic filaments.

The ends of these conduits may also lead to a fluid expansion chamber, or may widen to form a chamber in which the gaseous fluid is distributed. This chamber displays a wall which is inclined toward the area where the organic filaments are formed, and which is perforated with a plurality of orifices or is composed of a screen over at least a part of its height. This chamber may be situated between the area over which the glass filaments travel, below the central passage, and the area where the organic filaments are formed. It may also be situated between the wall which forms the bottom part of the hood and the area where the organic filaments are formed.

BRIEF DESCRIPTION OF THE DRAWINGS

The apparatus according to the invention will be more clearly explained by the detailed description which follows, and by the accompanying drawings, wherein:

FIG. 5 is a schematic view, partly in cross-section, of a third embodiment of the invention; and FIG. 6 is a partial schematic plan view of a variation applicable to the embodiments illustrated in FIGS. 3 to 5.

DETAILED DESCRIPTION OF THE PREFERRED EMBODIMENTS

Figure 1:
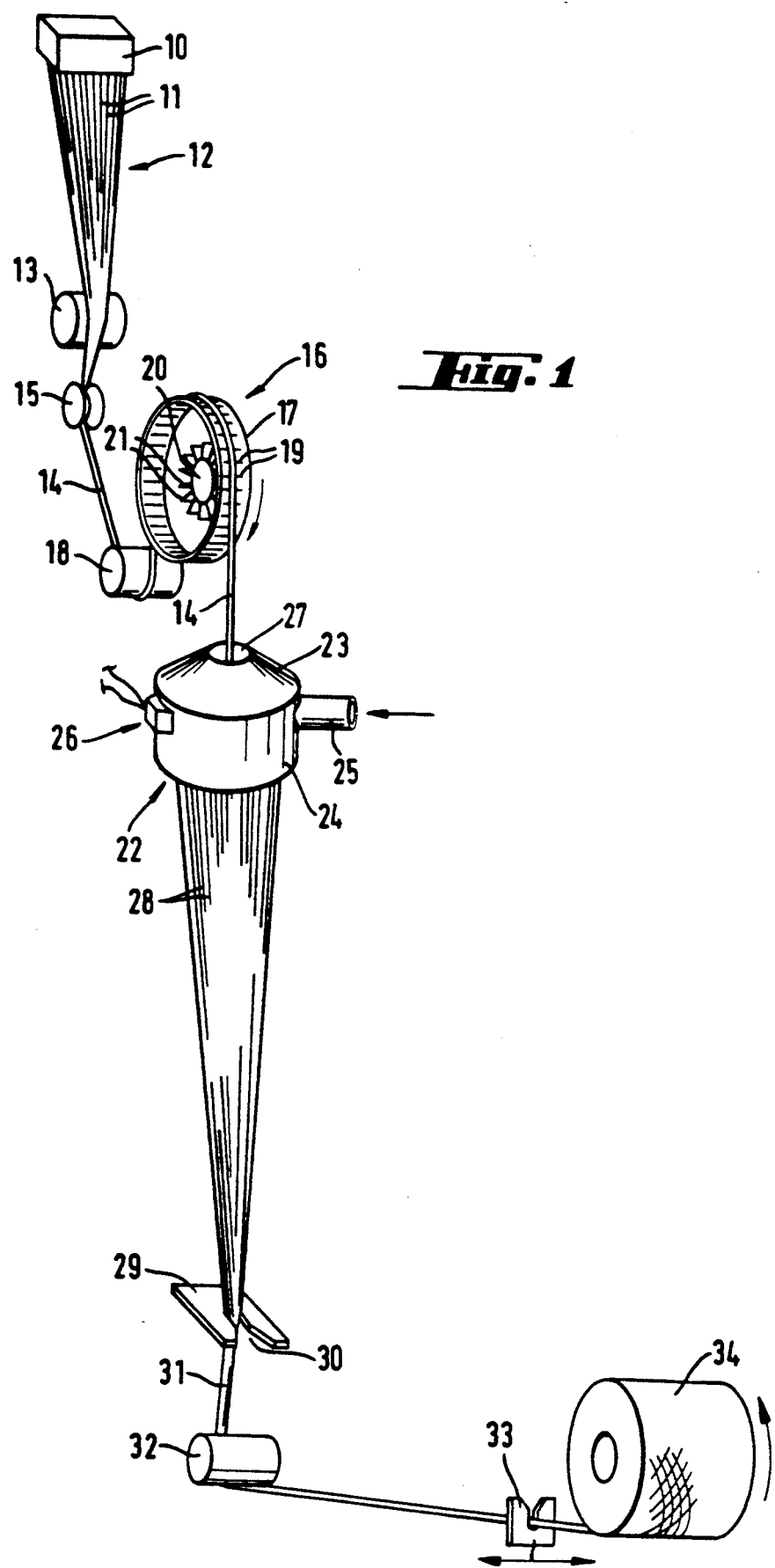
FIG. 1 is a general schematic view of an apparatus for manufacturing a composite strand according to the invention.

FIG. 1 illustrates a combination of two installations, one producing glass filaments and the other producing organic filaments.

The first installation comprises a group of devices for the production of continuous glass filaments by mechanical drawing through a die. The die, schematically illustrated at 10, is ordinarily connected to a glass feeding source. This source may be the front part of a furnace that directly carries the molten glass up to the top of the die 10. It may also be a hopper containing cold glass, which may be produced and stored in the form of marbles, for example, and which supplies the die by simple gravity feed.

In either instance, the die 10 is generally made of a platinum-rhodium alloy, and is heated by Joule effect. This die makes it possible to melt the glass or to keep it at a high temperature and at a viscosity suitable for its extrusion.

The molten glass flows in the form of a thin stream from the numerous orifices situated in the base of the die. These streams of glass are immediately drawn into numerous continuous filaments 11 that are grouped in a single layer 12. The filaments are coated with a lubricant or size by a device represented by the wheel 13. This device may consist of a vat, which is continuously supplied with a bath of lubricant or size, and in which the bottom part of a rotating roller is immersed. This roller coats itself with a film of lubricant or size that is then applied to the filaments which come into contact with its surface. The size applied by this device is intended to improve the bonding of the glass fibers to the organic material. Many formulations are known for such sizing material, for example, those described in French patent FR 2 167 771. The filaments 11 may also be coated with a size comprising at least one photoactivator, which triggers a chemical transformation of the size under the effect of actinic radiation. U.S. patent application No. 5,049,407 describes size formulae that are suitable for use with this invention, such as those sizes defined in examples 8 and 12 of the aforementioned patent. The content of this U.S. Pat. No. 5,049,407 is expressly incorporated herein by reference thereto.

After being coated with size or lubricant, filaments 11 are combined into a single strand 14 by an assembly device 15; this device may be a grooved wheel. The strand 14 and the filaments 11 up the line from it, are conveyed and mechanically drawn by a conveying device 16 which is driven by a motor (not shown). This device is well known, and is described in more detail in U.S. Pat. No. 3,265,482. It is composed of a pull wheel 17 and a device 18 for guiding the strand. The device 18 is mounted such that it impinges the strand 14 on the periphery of the wheel 17 over a sufficient length to cause the strand to be conveyed by simple friction. The periphery of the wheel 17 comprises a series of transverse slots 19 which are spaced at regular intervals.

A second wheel 20, of a smaller diameter than that of wheel 17, and equipped at its periphery with radiating blades 21, is installed inside the wheel 17. The wheel 20 is eccentric as compared to the wheel 17, such that the extremities of the blades 21 pass through the slots 19. The wheel 20 is driven in a rotating movement, which is synchronized with that of the wheel 17, through a transmission device or a mechanical linkage, not shown. Under the combined action of wheels 17 and 20, the strand 14 is conveyed mechanically, then separated from the wheel 17 by the blades 21. From the area where it is separated, the strand follows a path that is essentially tangential to the wheel 17. The path of the projected strand may thus be precisely determined by choosing the appropriate position for the wheel 20.

The second installation 22 is illustrated in an external view in FIG. 1. This device comprises a hood, composed of a frustum 23 which is extended from the periphery of its base by a cylindrical wall 24. This hood shields a drawing head which is annular in shape (not shown), wherein the frustum 23 is on top of the head and the wall 24 surrounds its exterior lateral wall. Molten thermoplastic polymer is supplied to this drawing head under pressure. The polymer intake is represented by the conduit 25. On the cylindrical wall of the hood are schematically illustrated a box and wires 26 representing an electric power supply device. This device heats the walls of the annular die by means of an electrical resistance.

The hood comprises its top a circular opening 27, in the centerline of which the strand 14 is projected.

By extrusion, then mechanical drawing, there is formed a layer of organic filaments 28, with the external appearance of a cone with a downward-pointing apex. Since the strand 14 is projected in the centerline of the cone, its apex corresponds to the area Where the set of organic filaments and the strand 14 are joined.

An assembly device 29, equipped with a simple notch 30, causes the strand 14 to be physically joined to the filaments 28, thereby producing a composite strand 31.

After it is conveyed by the device 32, the strand 31 is wound directly around a rotating support (not shown). The strand 31 is distributed on this support by a strand guiding device, which is represented by the notched plate 33, and conveyed in a back-and-forth motion as schematically illustrated by the double arrow. The product obtained in this example is a spool with straight sides 34.

If the size applied to the filaments 11 will react under the effect of actinic radiation such as ultraviolet radiation, a source of ultraviolet radiation may be installed in the path of the composite strand, for example between the assembly device 29 and the guiding device 32. The effect of the transformation, at least partially, of the size under the effect of this radiation is to improve the bonding of the composite strand produced.

Figure 2:
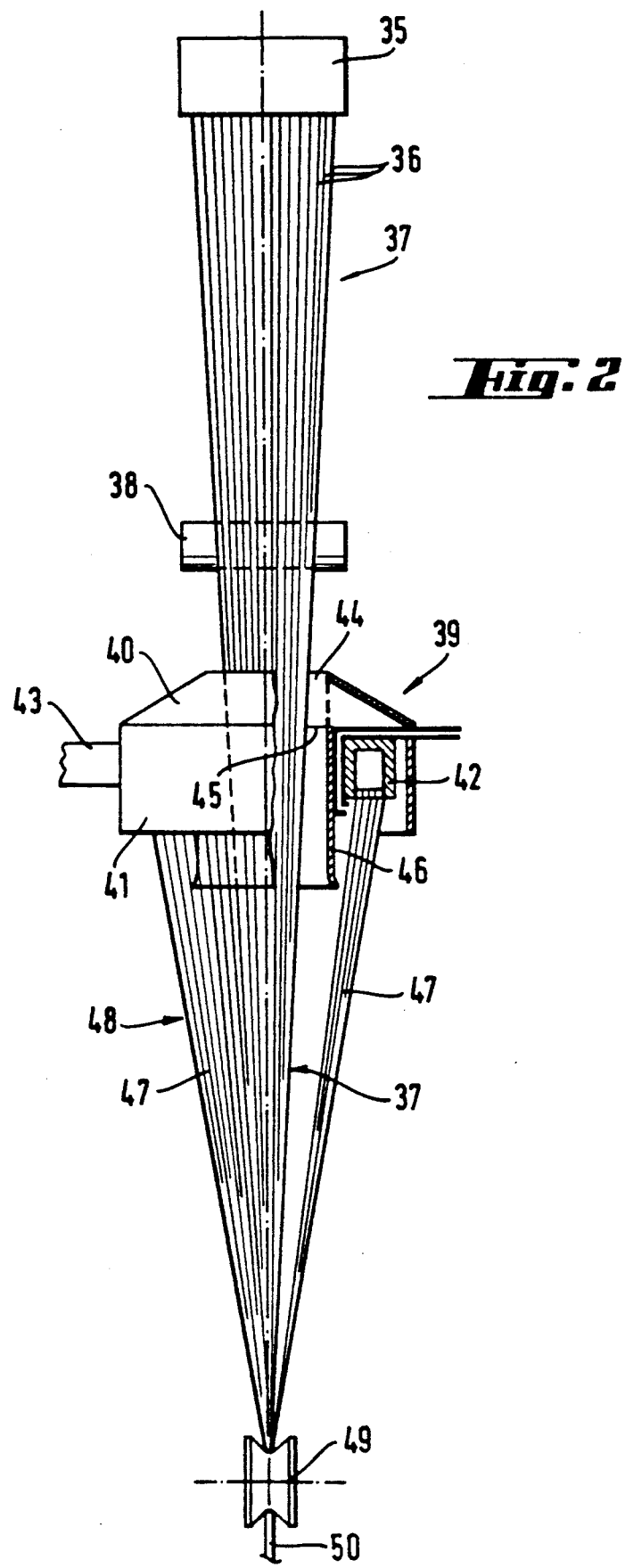
FIG. 2 is a partial schematic view of a configuration of the apparatus, partly in cross-section, for manufacturing a composite strand according to the invention.

FIG. 2 illustrates a further means of combining the installations for implementing the invention.

The die 35, which is similar to die 10, delivers a plurality of glass filaments 36, which form a single layer 37. These filaments are coated with size or lubricant by the device represented by the roller 38. The die 35 and the device 38 are situated above the installation 39, substantially in the vertical centerline of the installation.

As in the configuration of the fiber extrusion devices illustrated in FIG. 1, the second installation comprises a hood formed of a frustum 40 which is extended at the periphery of its base by a cylindrical wall 41. This hood shields an annular drawing head 42, to which with molten thermoplastic polymer is supplied under pressure, through the thermostatically controlled conduit 43. The frustum 40 comprises, at its top and at its base, two circular openings 44 and 45 having the same centerline as the drawing head 42. The opening 45 extends downward in a cylinder 46, which is an integral part of the base of the frustum 40 and which passes through the central passage of the drawing head 42 as defined by the tubular shaped inner wall of the head.

Organic filaments 47 are mechanically drawn from the head 42 in the form of a conical layer 48. Layers 37 and 48 are combined by the assembly wheel 49 from which a composite strand 50 is formed.

Figure 3:
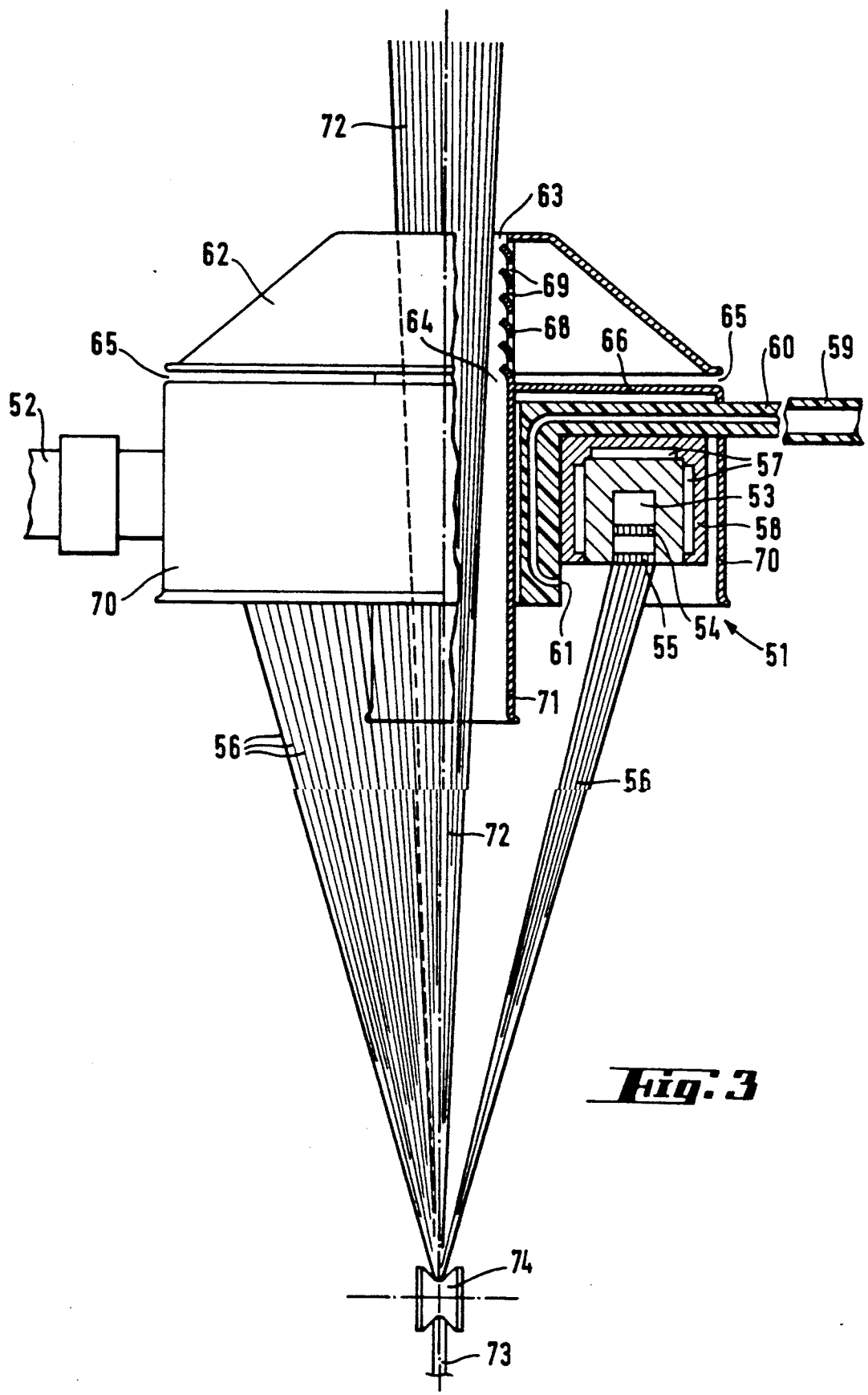
FIG. 3 is a schematic view, partly in cross-section, of an embodiment of the invention using the apparatus illustrated in FIG. 2.

FIG. 3 schematically illustrates a partial cross-sectional view of the second drawing installation of the device for manufacturing a composite strand in the configuration depicted in FIG. 2.

This installation comprises an annular drawing head 51, which is supplied with organic thermoplastic material by an extruding machine. This material, for example a polypropylene, is melted in the extruding machine and then transported in the liquid state through the conduit 52 up to the extrusion chamber 53 of the head 51. Under pressure, the material passes through a screen 54 and flows through the orifices 55, which are distributed over an annular die-plate at the base of the head 51. The extruded material is immediately drawn mechanically by a device (not shown) into a plurality of continuous filaments 56. The material is kept in the fluid state by heating means, such as an electrical resistance elements 57, which are positioned on the various walls of the head 51. The walls of the head 51 and the heating means 57 are surrounded by a layer of thermal insulation, such as a layer of asbestos 58.

One or more ducts 59 are connected to a source of gaseous fluid under pressure, for example a source of air from a fan, the speed and output of which is regulated. This duct is connected to one or more conduits 60 located along the top of the head 51 and along its inside lateral wall. A diffuser (not shown) is advantageously mounted inside the conduits. This conduit forms an elbow, after which its extremity 61 opens below the base of the fiber extrusion head, in a direction toward the area where the filaments 56 are formed. The duct or ducts 59 may be connected to other conduits along the exterior lateral wall of the fiber extrusion head 51, the extremities of which are also directed toward the area where the filaments 56 are formed.

The drawing head assembly is shielded by a hood, which is externally formed of a frusto-conical wall 62 at its top and of a cylindrical wall 70 at its bottom.

The top part of the hood is covered at its base by a plate 66, which is connected to the wall 62, and which fits above the drawing head 51. This top part comprises two circular openings 63 and 64, of the same diameter, the first being at the top and the second being at the center of the plate 66. These two openings are connected by a cylindrical wall 68, which is perforated with a plurality of orifices 69. This wall may be composed of a simple screen.

Several horizontal slots 65 are provided near the plate 66, at the bottom part of the wall 66. The slots 65 may be replaced by one or more orifices that are connected to a suction device. Thus, the quantity of air that is driven through the opening 64 may be controlled by regulating the amount of suction applied.

The bottom part of the hood, which is externally formed by the wall 70, completely surrounds the drawing head 51 and its equipment. This bottom part also comprises a solid inside wall 71, which is cylindrical in shape, in this instance. Its perpendicular section is not greater than that of the central passage of the head 51. This wall 71 is an integral part of the plate 66 and it extends below the base of the cylindrical wall 70, which in turn ends below the orifices 55 of the drawing head 51.

The air propelled by the layer 72 of glass filaments is largely deflected toward the outside of the wall 62. Part of the air that passes through the opening 63 is evacuated through apertures 65 by way of the orifices 69. The remaining air that is propelled by the glass filaments passing in the cylinder 71 escapes at a distance sufficient to prevent interference with the fiber extrusion area of the organic filaments 56. As indicated in the foregoing, the quantity of air propelled by the filaments at this stage may be controlled by suctioning the air from the top part of the hood. The atmosphere in this area is controlled by the diffusion of air emanating from the extremities 61 of the conduits 60.

Figure 4:
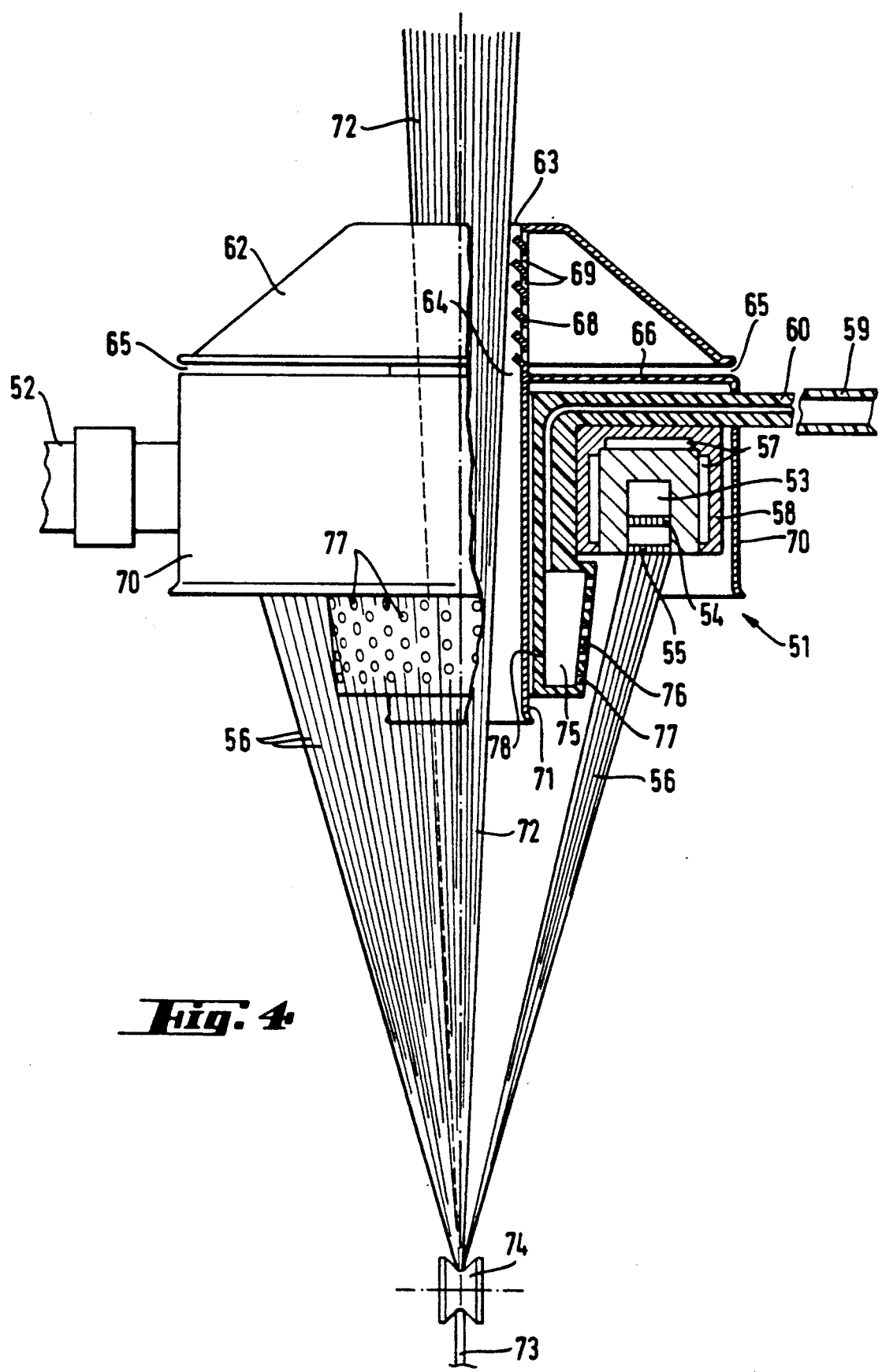
FIG. 4 is a schematic view, partly in cross-section, of a second embodiment of the invention.

FIG. 4 illustrates a further embodiment of the invention in an installation similar to that depicted in FIG. 3. The difference resides in the blowing device.

The gaseous fluid intake conduit or conduits 60 running along the top of the drawing head 51 and its inside lateral wall, open into an expansion chamber 75. This chamber displays a wall 76 which is frusto-conical in shape and inclined toward the area where the organic filaments 56 are formed. The wall 76 is perforated with a large number of orifices 77. The top of this chamber is near the level of orifices 55 of the head 51 while its base is at a lower level than the base of the exterior wall 70.

Opposite the wall 76, the chamber 75 is delimited by a solid wall 78. This wall 78 is cylindrical in this example of the invention. The inside wall of the conduits 60 which extend upwardly may replace the inside wall 71.

FIG. 5 illustrates a third embodiment of the invention in an installation wherein the hood and the drawing head are similar to those represented in the installation of FIG. 3.

The conduits 79 for the gaseous fluid arrive at the base of an expansion chamber 80 that displays a cylindrical shape from the outside. The bottom part of the wall 70 surrounds the top of the chamber 80, which is situated in proximity to orifices 55. The exterior wall 81 of the chamber extends the wall 70 downward.

The chamber 80 displays an inside wall 82 which is frusto-conical in shape and inclined toward the area where the organic filaments 56 are formed. Wall 82 is perforated with a large number of orifices.

When filaments 56 are drawn at high speeds, it is preferable to employ a blowing device comprising an expansion chamber, according to one of the embodiments illustrated in FIGS. 4 and 5. The function of such chambers is to distribute the gaseous fluid, generally air, over a large surface. The air is thus distributed at low and relatively constant speeds over the entire area where the filaments 56 are formed, thereby providing uniformity of the drawing process. In order to maximize the uniformity of diffusion of the air, the walls 76, 82 are advantageously composed of one or more layers of metallic cloth or porous material.

FIG. 6 is a highly schematic plan view of a particular embodiment of the invention. It illustrates the frusto-conical section 83 of the top part of a hood that covers a drawing head 84, shown in dashed lines. To simplify the diagram, the equipment around the head 84 is not represented.

The hood displays at its top a circular opening 85 which is coaxial to the central passage 86 of the drawing head. This head is not in a fully annular shape, but rather in the shape of a horseshoe with its two extremities 87 and 88 defining a lateral passage 89.

The hood is also open along its full height. With reference to use of this hood in the embodiment of FIGS. 4 and 5, this opening is in the exterior wall 70 as described in the foregoing, as well as in the frusto-conical top part and the inside wall 71. This is represented by the passage 90. The blowing devices also display a similarly discontinuous area.

After shutting down the die which delivers the glass filaments, configuration of FIG. 6 makes it possible, when the die is again set in motion, to easily reposition the glass filaments in the center of the second installation.

The embodiments described in the foregoing are provided as non-limiting examples of the invention. More specifically, it will be possible for those skilled in the art to modify the shape of the hood and to combine it with one or more blowing devices without departing from the scope of this invention.

We claim:

1. In an apparatus for manufacturing a composite strand (31, 50, 73), composed of a first installation comprising at least one die (10, 35), which is supplied with glass and heated by Joule effect, and which is perforated at the bottom with a plurality of orifices from which continuous filaments (11, 36, 72) are drawn, and of a second installation comprising at least one drawing head (42, 51, 84), which is supplied under pressure with organic thermoplastic material in the molten state, and comprising a central passage through which said glass filaments (11, 36, 72) are drawn, said at least one drawing head (42, 51, 84) comprising at least one conduit (25, 43, 52) for supplying said organic material, which is connected to a chamber (53) that opens onto a plurality of orifices (55) on its bottom side, and through which the organic material is extruded to produce continuous filaments (28, 47, 56), the improvement comprising a hood which shields each of the at least one drawing head and includes:

a) a top part (23, 40, 62) which fits immediately above said at least one drawing head and contains an opening (27, 44, 63) at its top which is disposed coaxially to the central passage, the top part of the hood being externally formed of one or more plates (23, 40, 62), which are inclined relative to the vertical centerline of the central passage; and b) a bottom part which is formed of a wall (24, 41, 70) immediately surrounding said at least one drawing head and extending below the bottom of the said at least one drawing head.

2. In the apparatus of claim 1, the improvement further comprising:

a) a blowing device for blowing a gaseous fluid located within and shielded at least partly by the bottom part of the hood; and b) at least one orifice (61, 77) in said device, said at least one orifice opening in a direction toward the area where the organic filaments (56) are formed, each of said at least one orifice being situated between the area where the organic filaments (56) are formed and either the central passage or the bottom wall (24, 41, 70) of the hood (70).

3. Apparatus according to claim 2, wherein said blowing device includes one or more fluid supply ducts (59), connected to one or more conduits (60) situated above the drawing head (51), and extending along the central passage, and ending in an orifice or a plurality of orifices directed toward the area where the organic filaments are formed.

4. Apparatus according to claim 3, wherein an extremity of each conduit (60) terminates in at least one slot (61) which opens below the level of the bottom of said head (51).

5. Apparatus according to claim 3, wherein the extremity of each conduit (60) opens into at least one expansion chamber (75) for said gaseous fluid, the wall (76) of which is inclined toward the area where the organic filaments (56) are formed and is perforated with a plurality of orifices (77) along at least part of its height.

6. Apparatus according to claim 5, wherein the expansion chamber forms at least part of an inside wall that is cylindrical or prismatic in shape, and has a perpendicular section which is of a size no greater than the central passage, and extends from the top of the said central passage to at least the same level as the wall (70) which externally forms the bottom part of the hood.

7. Apparatus according to claim 2 wherein said blowing device for a gaseous fluid includes at least one intake conduit (79) for said fluid, which opens into at least one expansion chamber (80) for said fluid, which is situated on the periphery of the area where the organic filaments (56) are formed, and wherein said chamber comprises a wall (82) which is inclined toward the said area and is perforated with a plurality of orifices along at least part of its height.

8. Apparatus according to claim 7, wherein the fluid expansion chamber (80) displays an exterior wall (81) that extends downward, along at least part of its height, below the exterior wall (70) which forms the bottom part of the hood.

9. Apparatus according to claim 2, wherein said at least one drawing head (84) of said second installation includes along its entire height a lateral passage (90) between the outside of said second installation and the central passage (86) of said at least one drawing head, and the hood and blowing device display along their entire height a lateral passage in axial alignment with the lateral passage of the said at least one drawing head.

10. Apparatus according to claim 1, wherein the top part of the hood (23, 40, 62) is frusto-conical or frusto-prismatic in shape.

11. Apparatus according to claim 1 or claim 10, wherein the top part of the hood includes at least one lateral opening (65).

12. Apparatus according to claim 11, wherein the lateral opening (65) is formed by at least one slot.

13. Apparatus according to claim 11, wherein the top part of the hood is closed at its base by a plate (66), which fits above the at least one drawing head (51), and which is equipped at its center with an opening (64) disposed coaxially to the centerline of the central passage.

14. Apparatus according to claim 13, wherein the hood comprises an inside wall, which is solid (46, 71), the perpendicular section of which is no greater than the size of the central passage of the drawing head, and which extends downwardly from at least the opening (64) of the plate (66) which covers the base of the top part of the said hood, to at least the level of the bottom of the wall (41, 70) that externally forms the bottom part of the hood.

15. Apparatus according to claim 14, wherein the hood comprises an inside wall (68, 71), which is cylindrical or prismatic in shape, wherein its perpendicular section is no greater than the size of the central passage of the drawing head and which extends from the edge of the opening (63) situated at the top of the hood to the base of the wall (70) which externally forms the bottom part of the hood, and wherein the top part (68) of said inside wall is perforated with a plurality of orifices (69).

16. Apparatus according to claim 11, wherein the top part of the hood comprises an inside wall (68), which is perforated with orifices (69), and which extends, inside said hood, from the edge of the opening (63) situated at the top of the hood, to the top of the central passage of the drawing head.

* * * * *